United States Patent
Gupta et al.

(12) 
(10) Patent No.: US 6,226,516 B1
(45) Date of Patent: May 1, 2001

(54) METHOD FOR INVOKING DYNAMICALLY MODIFIABLE SUBSCRIBER SERVICES AND AN INTELLIGENT TELECOMMUNICATION NETWORK INCORPORATING THE SAME

(75) Inventors: Rohit Gupta; Daniel Cohn, both of Plano, TX (US); John Visser, Nepean (CA)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/050,591

(22) Filed: Mar. 30, 1998

(51) Int. Cl.7 .............................. H04Q 7/30; H04Q 7/38; H04M 11/00
(52) U.S. Cl. .................. 455/433; 455/414; 379/913; 379/201; 379/207
(58) Field of Search .................. 455/433, 461, 455/564, 414; 379/201, 207, 912, 913

(56) References Cited

U.S. PATENT DOCUMENTS

| | | | |
|---|---|---|---|
| 5,377,186 | * 12/1994 | Wegner et al. | 370/62 |
| 5,619,562 | * 4/1997 | Maurer et al. | 379/201 |
| 5,898,917 | * 4/1999 | Batni et al. | 455/564 |
| 5,901,359 | * 5/1999 | Malmstrom | 455/461 |
| 5,920,820 | * 7/1999 | Qureshi et al. | 455/461 |
| 5,940,487 | * 8/1999 | Bunch et al. | 379/201 |
| 5,946,383 | * 8/1999 | Havens et al. | 379/207 |
| 6,041,110 | * 3/2000 | Lautenschlager et al. | 379/201 |

* cited by examiner

Primary Examiner—Daniel S. Hunter
Assistant Examiner—Alan T. Gantt
(74) Attorney, Agent, or Firm—Haynes and Boone, LLP

(57) ABSTRACT

A terminal coupled to an intelligent telecommunication network may invoke dynamically modifiable subscriber services by transmitting information to a switch to which script files, each containing programming script needed to initiate a calling feature or other advanced subscriber service and a criteria statement used for triggering execution of the programming script, were downloaded thereto from a home location register where the script files may be added, deleted or otherwise modified by a system administrator. A program execution module residing at the switch compares the received information to the criteria statement for each script file downloaded thereto and executes the programming script of the script file having a criteria statement which matches the received string of digits. In wireless systems, the script files are downloaded to an MSC whenever a roaming terminal registers therewith.

34 Claims, 2 Drawing Sheets

METHOD FOR INVOKING DYNAMICALLY MODIFIABLE SUBSCRIBER SERVICES AND AN INTELLIGENT TELECOMMUNICATION NETWORK INCORPORATING THE SAME

TECHNICAL FIELD

The invention relates generally to intelligent telecommunication networks and, more particularly, to an intelligent telecommunication network which achieves dynamically modifiable advanced subscriber services through the use of downloadable script files as triggers therefor.

BACKGROUND OF THE INVENTION

In the field of telecommunications, an "intelligent network" is characterized by the placement of service logic in an external database located outside the switch. The use of such a database, commonly referred to as a service control platform (or "SCP") became popular because, by placing the service logic at a central location, services could be deployed and/or modified without having to re-program every switch in the network. Both wireline and wireless switches using call processing triggers to initiate accesses to the SCP which provides advanced subscriber services. Perhaps the best known of these call processing triggers is the "1-800" trigger. When a switch receives a string of digits to an 800 number, for example, 1-800-4NORTEL, the switch recognizes the first four digits of the number as a trigger and, in response to the receipt thereof, issues a query to an SCP asking that the SCP identify a telephone number which corresponds to "4NORTEL", the digits which followed the trigger. The SCP returns a telephone number which the switch uses to complete the requested connection. Of course, a multitude of other advanced subscriber services, for example, the various calling card services, are also accomplished by trigger-actuated accesses of a SCP by a switch receiving a string of digits matching a trigger.

Presently, detectable triggers are confined to a static set of criteria, all of which are defined by various standards committees. As a result, there are only a limited number of triggers presently in use. Furthermore, to place a new trigger into use requires a lengthy approval process which can delay commercial availability of the trigger by two or more years. While a service provider is free to independently provide triggers recognizable by the switch or switches operated thereby, such independently provided triggers cannot be recognized outside the service provider's system. For example, if the service provider is a cellular or PCS system which uses independently selected triggers, i.e., triggers that actuate upon an occurrence of a criteria not approved by the governing standards committee, to provide advanced subscriber features to their customers, those customers would be unable to use such subscriber features outside the service provider's system, for example, when the customer "roams" outside its home system.

SUMMARY OF THE INVENTION

In the past, a user requested a calling feature or other advanced subscriber service by dialing a specified string of digits. When detected by a switch, the string of digits caused the switch to take an action, for example, the generation of a message to a service control point where information necessary to provide the requested calling feature resides. Traditionally, switches had only contained a limited number of triggers, each incorporated into the switch after successfully undergoing a time consuming approval process by a standards committee followed by a lengthy development process. In contrast with prior techniques, the present invention greatly enhances the ability to add, delete or otherwise modify calling features and other advanced subscriber services for users of an intelligent telecommunications network by enabling any number of additional triggers to be provided at the switch.

Such flexibility is achieved by providing downloadable script files, each containing programming script needed to initiate a calling feature or other advanced subscriber service and a criteria statement used for triggering execution of the programming script at a database located at a central office or at a home location register. While the programming script may include the information necessary for the switch to provide the calling feature or other advanced subscriber service, generally, execution of the programming script causes the switch to transmit a message to a device containing the information needed to provide the calling feature or other advanced subscriber service, for example, by sending an appropriate message to an off-board SCP. The criteria statement may include both a description of the type of trigger and/or the trigger criteria which must be met in order to initiate the execution of the programming script. Whenever a trigger criteria of an indicated type of trigger is received, for example, by a caller transmitting a string of N digits to a switch to which the script files were previously downloaded, the switch compares the type of trigger (string of N digits) and the trigger criteria (the specific string of digits received) to the trigger type and criteria of the criteria statement for each of the script files downloaded thereto. If a match is detected, the switch executes the programming script contained in the script file having the matching criteria statement or, in an alternate embodiment, the switch could execute a corresponding set of instructions previously stored thereby and pointed to by the criteria statement. By periodically downloading, to a switching device, criteria statements which trigger calling features or other advanced subscriber services when matched to a trigger criteria received by a switching device, great flexibility as to available calling features is achieved. Specifically, a user interface coupled to the central office or home location register from which the script files are downloaded may be used to add, delete or modify the script files maintained thereat.

The invention is suited for use in a variety of intelligent telecommunication network applications. For example, in a wireless intelligent telecommunication network, the script files may be stored in a home location register for a subscriber. While held in the home location register, the script files may be readily edited by a user interface thereto. When a subscriber roams outside its home system, the registration process with the visited mobile switching center includes a download of the script files to a visitor location register thereof. When the subscriber transmits a trigger criteria to a mobile switching center to which it previously registered, the mobile switching center compares the trigger type and the received trigger criteria to appropriate portions of criteria statements held in the visitor location register (if the mobile switching center is outside the home system for the subscriber) or the home location register (if the mobile switching center is within the home system for the subscriber) and, if a matching criteria statement is located, the mobile switching center executes the programming script contained in the script file containing the matching criteria statement. Application of the invention within a wireline intelligent network is similar. Here, however, the script files in a database located at the home office where they may be modified through a user interface coupled thereto.

BRIEF DESCRIPTION OF THE DRAWINGS

FIG. 1b is an expanded block diagram of the mobile switching center of FIG. 1a.

DESCRIPTION OF A PREFERRED EMBODIMENT

Figure 1A:
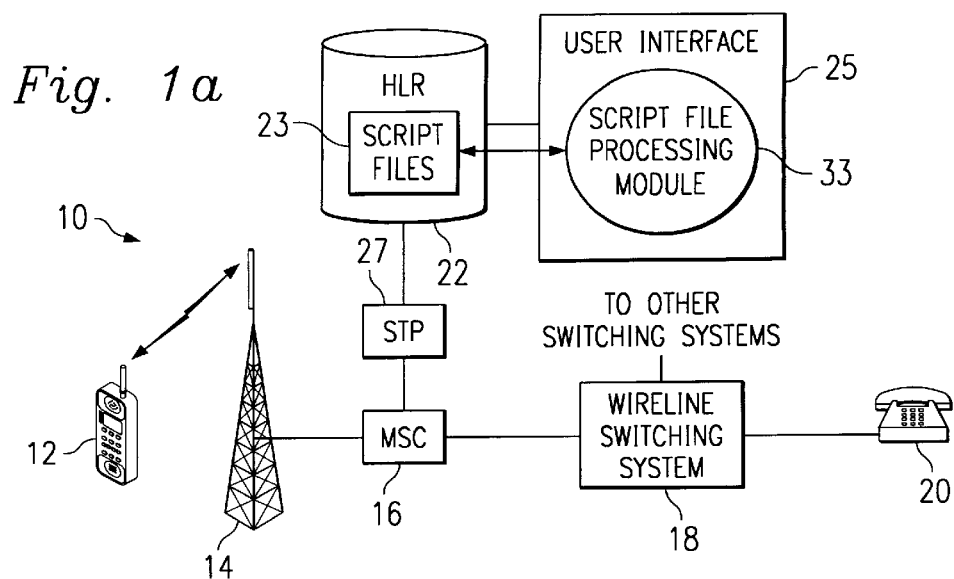
FIG. 1a is a block diagram of an intelligent wireless telecommunications network which includes a mobile switching center constructed in accordance with the teachings of the present invention.

Turning now to the drawings, in FIG. 1, the reference numeral 10 designates an intelligent telecommunications network 10 which includes both an intelligent wireless portion and a wireline portion. For example, the wireless portion may be a cellular network while the wireline portion may be a public switched telephone network (or "PSTN"). The intelligent wireless portion of the intelligent telecommunications network 10 include at least one mobile terminal 12 configured to transmit and receive messages to a mobile switching center ("MSC") 16 via a base station 14 within range of the mobile terminal 12 and coupled to the MSC 16. The wireline portion of the telecommunications network 10 includes a switching system 18 for establishing connections between originating and destination terminals. Of course, the wireline portion of the intelligent telecommunications network 10 includes plural switching systems but, for ease of illustration, only the switching system 18 is shown in FIG. 1a. Similarly, while the wireline portion of the telecommunication network includes plural voice terminals, again, for ease of illustration, only one such voice terminal, a telephone 20, is shown in FIG. 1a.

As will be more fully described below, also coupled to the MSC 16 is a home location register (or "HLR") 22 for the mobile terminal 12. The HLR 22 is a database for storing customer profile information such as features, dialing capabilities, and the home serving area identification. The HLR 22 also maintains script files 23 which, as will be more fully described below, are used to trigger various advanced subscriber services. A user interface 25, which, for example, may be a conventional computer system user interface such as a keyboard and monitor, is coupled to the HLR 22. By operating the user interface 25, a system administrator for the HLR 22 may add new script files, modify existing script files or delete existing script files. As each individual script file triggers a respective advanced subscriber service, by modifying the collection of script files 23 maintained in the HLR 22, the advanced subscriber services available to the mobile terminal may be dynamically modified. Finally, the MSC 16 is coupled to the HLR 22 by a signaling transfer point (or "STP") 27.

Figure 1B:
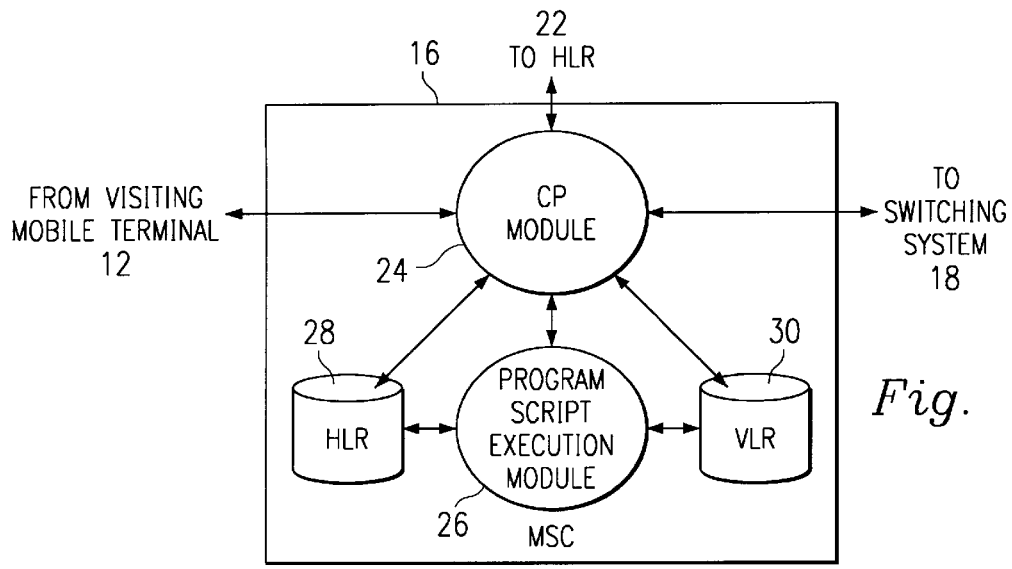

Referring next to FIG. 1b, the MSC 16 may now be seen in greater detail. Of course, it should be clearly understood that, like the intelligent telecommunications network 10, the MSC 16 has been greatly simplified and that various components thereof have been omitted for ease of illustration. The MSC 16, which, for example, may be a DMS-MTX MSC manufactured by Northern Telecom Ltd. of Montreal, Canada, includes a call processing (or "CP") module 24, a software module which resides on a processor subsystem (not shown) of the MSC 16 and performs a variety of call processing operations such as call set-up where the MSC 16 establishes a connection between an originating terminal, for example, the mobile terminal 12, coupled to the MSC 16 by the base station 14, and a destination terminal, for example, the voice terminal 20 coupled to the MSC 16 by the switching system 18. The MSC also includes a home location register (or "HLR") 28 and a visitor location register (or "VLR") 30, both of which are coupled to the CP module 24. The HLR 28 maintains user profiles for mobile terminals which have the MSC 16 as their home system. The VLR 30, on the other hand, maintains user profiles for mobile terminals visiting the MSC 16. As disclosed herein, the HLR 28 and the VLR 30 reside as part of a memory subsystem (not shown) of the MSC 16. In an alternate embodiment of the invention, however, it is contemplated that the HLR 28 and the VLR 30 may reside on a separate off-board platform.

Also residing on the processor subsystem of the MSC 16 is a program script execution module 26 coupled to the CP module 24, the HLR 28 and the VLR 30. As will be more fully described below, the program script execution module 26 processes script files, maintained in either the HLR 28 or the VLR 30. It should be noted that, while FIG. 1b illustrates the CP module 24 and the program script execution module 26 as discrete software components, it is contemplated that, in an alternate embodiment of the invention, the program script execution module 26 could be incorporated into the CP module 24.

Figure 1C:
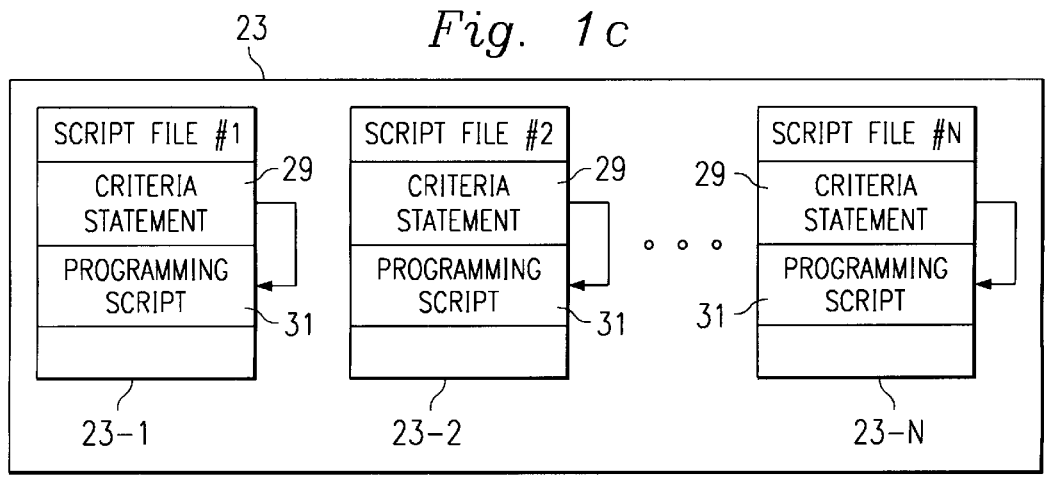
FIG. 1c is a block diagram of script files downloaded to the mobile switching center of FIG. 1b.

Referring next to FIG. 1c, the script files 23 shall now be described in greater detail. Each script file 23-1 through 23-N of the script files 23 is comprised of a criteria statement 29 which points to programming script 31 The criteria statement 29 and the programming script 31 are respectively comprised of complex logical statements written in a programming language consisting of operators and operands. As may now be further seen, the criteria statement 29 includes first and second portions 29a and 29b. The first portion 29a of the criteria statement 29 describes the type of trigger which the program script execution module 26 should look for. Two examples of possible trigger types are "3-digit" and "time of call". If the trigger type is "3-digit", the program script execution module 26 will compare the first three digits of the string of digits received from the mobile terminal 12 during call set-up to the trigger criteria contained in the second portion 29b of the criteria statement 29. Conversely, if the trigger type is "time of call", the program script execution module 26 will compare the time at which call set-up is initiated to the trigger criteria contained in the second portion 29b of the criteria statement 29.

The logical statements are arranged in a concise and unambiguous form such as Reverse Polish Notation (or "RPN"). Both the user interface 25 and the MSC 16 should have an application programming interface (or API) capable of accepting the logical statements contained in the criteria statement 29 and programming script 31, determine if the trigger criteria contained in the criteria statement 29 have been meet and execute the commands contained in the programming script 31. For the MSC 26, the program script execution module 26 provides the requisite API and a similarly configured API, specifically, a script file processing module 33, resides on the user interface 25. As will be more fully described below, upon receipt, by the MSC 16, of information related to a call set-up, the program script execution module 26 checks the contents of the trigger type contained in the first portion 29a of the criteria statement 29 for each downloaded script file 23-1 through 23-N to determine if the received information contains any possible triggers and, if the received information includes information of a type categorized as a trigger type, the program script execution module 26 will then compare the received information of the indicated type to the trigger criteria contained in the second portion 29b of the criteria statement 29 of the corresponding script files 23-1 through 23-N stored at the VLR 30 (if the mobile terminal 12 is visiting the MSC 16) or the HLR 28 (if the mobile terminal 12 is in its home system). If the received information matches the trigger criteria 29b of the criteria statement 29 of one of the script files 23-1 through 23-N, the program script execution module 26 then executes the programming script 31 of the script file 23-1 through 23-N having the matching criteria statement 29.

In an alternate embodiment of the invention, the programming script 31 may be omitted from the script files 23-1 through 23-N. Such a configuration of the script files 23-1 through 23-N is possible when the calling feature or other advanced subscriber service initiated by the receipt of information which matches a trigger criteria is maintained within the CP module 24 of the MSC 16. In this embodiment, the criteria statement 29 would point to a location within the CP module 24 where a set of at least one instruction necessary to provide the triggered calling feature or other advanced subscriber service resides.

Figure 1D:
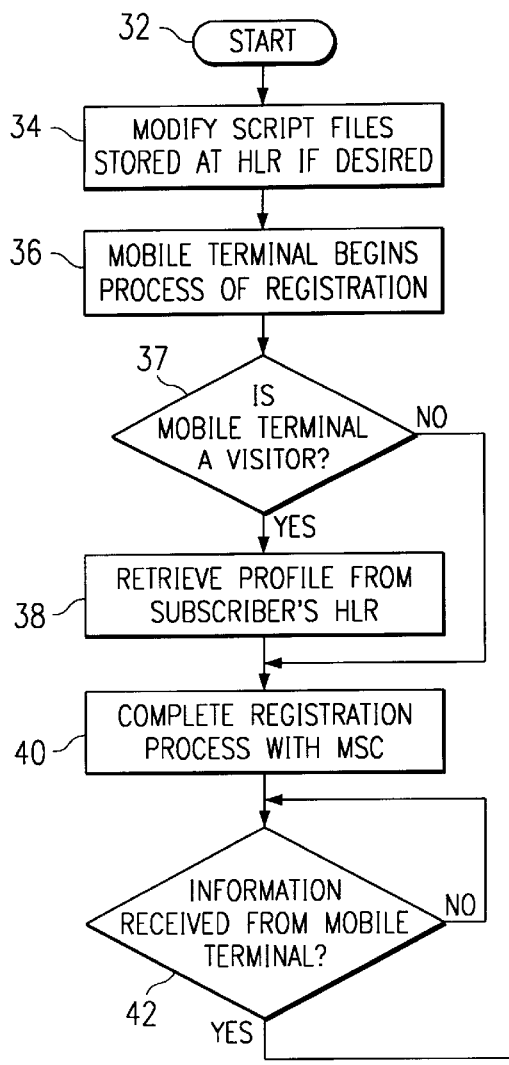
FIG. 1d is a method of invoking, at the mobile switching center of FIGS. 1a–b, dynamically specifiable subscriber services.
Figure 1D:
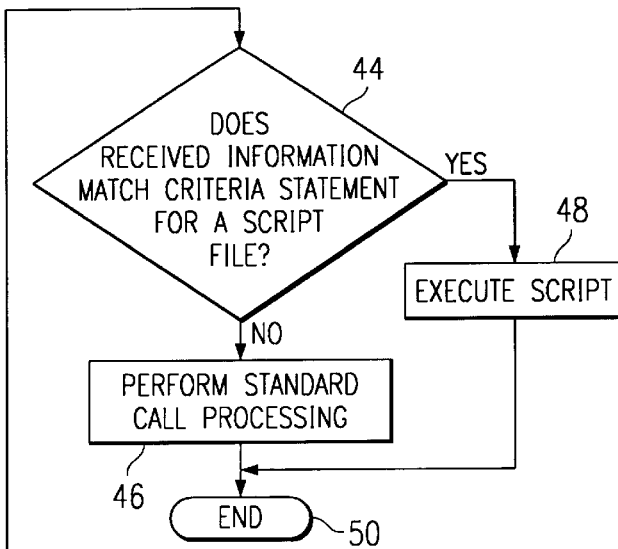

Referring next to FIG. 1d, a method of invoking dynamically modifiable subscriber services in accordance with the teachings of the present invention will now be described in greater detail. The method commences at step 32 and, at step 34, a system administrator for the HLR 22 may modify the script files 23, for example, by adding new script files, deleting existing script files or modifying existing script files, if desired. As each script file 23-1 through 23-N corresponds to an available subscriber service, by modifying the script files 23, the services available to subscribers may be dynamically modified at any time. Further, modification of the script files 23 may be conducted at any time since, the advanced services available to a particular subscriber shall be defined by the script files downloaded to a MSC or other switch servicing the subscriber.

The method then proceeds to step 36 where the mobile terminal 12 begins the process of registering with the MSC 16. For example, the registration process may be commenced when the mobile terminal 12 is powered on. When the mobile terminal 12 is powered on, it sends a data message to the base station 14. This data message contains the mobile identification number (or "MIN") and the electronic serial number (or "ESN") for the mobile terminal 12. The base station 14 forwards this information to the MSC 16. Continuing on to step 37, the MSC 16 determines if the mobile terminal 12 is in its home system or a visitor to the system by comparing the received MIN with a table of all MINs for the telecommunications network. If the received MIN indicates that the mobile terminal 12 is in its home system, the method proceeds to step 40 where the MSC 16 completes the registration process in conventional fashion.

If, however, the received MIN indicates that the mobile terminal 12 is a visitor, the method proceeds to step 38 where the MSC sends a message to the HLR 22 of the home system for the visiting mobile terminal 12. When the HLR 22 receives the message, it checks the MIN and the ESN. If the numbers are valid, the HLR 22 records the location of the mobile terminal 12 and returns a message which contains a profile for the mobile terminal 12 This profile contains a list of features for the mobile terminal 12. Upon receipt thereof, the MSC 16 stores the profile for the mobile terminal 12 in the VLR 30. Unlike conventional profiles, and in accordance with the teachings of the present invention, the profile for the mobile terminal 12 includes one or more of the script files 23. Specifically, if the mobile terminal 12 has been authorized for a particular advanced subscriber service, the script file 23-1 through 23-N corresponding to that service is included in the profile transferred to the VLR 30. The method then proceeds to step 40 where the registration processes for a visiting mobile terminal is completed in conventional fashion.

Typically, during the registration process, the MSC 16 receives a user profile, to be stored in the VLR 30, which contains a considerable amount of information describing the mobile terminal 12. Having registered the mobile terminal 12, the method proceeds to step 42 where the MSC 16 continuously awaits the initiation of a call set-up by the registered mobile terminal 12. Typically, when initiating a call set-up, the mobile terminal 12 will provide the MSC 16 with still further information. Upon receipt, by the CP module 24, of additional information from the mobile terminal 12, the method proceeds to step 44 where the received information, which includes both the user profile maintained in the VLR 30 and the information received as part of the call set-up request is analyzed to determine if the received information satisfies one of the criteria statements stored in the VLR 30 (if the mobile terminal 12 is a visitor to the MSC 16) or stored in the HLR 28 (if the mobile terminal 12 is in its home system). More specifically, the CP module 24 transmits the received information to the program script execution module 26 for analysis. The program script execution module 26 retrieves the script files 23-1 through 23-N stored in the HLR 28 (if the mobile terminal 12 is in its home system) or previously downloaded from the HLR 22 of the home system for the visiting mobile terminal 12 and stored in the VLR 30. The program script execution module 26 then checks the first portion 29a of the criteria statement 29 for each one of the retrieved script files 23-1 through 23-N to determine what types of received information may be triggers. The program script execution module 26 then checks the received information to determine if the received information includes information of any of the trigger types contained in the first portion 29a of the criteria statement 29 of each of the script files 23-1 through 23-N. If the received information includes information of one or more of the information types contained in the first portion 29a of the criteria statement 29 of the script files 23-1 through 23-N, the program script execution module 26 compares the received information of each such information type to the trigger criteria contained in the second portion 29b of the script files 23-1 through 23-N having a trigger type stored in the first portion 29a which matches a type of information received.

If the received information fails to include information of any of the information types contained in the first portions 29a of the criteria statements 29 of the script files 23-1 through 23-N or if the received information includes information of a type matching one or more of the information types identified in the first portions 29a of the criteria statements 29 of the script files 23-1 through 23-N but the received information of that information type fails to match the trigger criteria contained in the second portion 29b of the criteria statements 29 of the script files 23-1 through 23-N having a trigger type stored in the first portion 29a which matches a type of information received, the method proceeds to step 46 where the program script execution module 26 instructs the CP module 24 to process the received information in accordance with conventional call processing techniques. If, however, the program script execution module 26 determines that the received information matches the trigger criteria contained in the second portion 29b of the criteria statement 29 contained in one of the script files 23-1 through 23-N, the method proceeds to step 48 where the program script execution module 26 executes the programming script 31 of the script file 23-1 through 23-N having the second portion 29b of the criteria statement 29 which matches the received information of the indicated information type.

It is contemplated that the programming script 31 may contain a variety of instructions. For example, the programming script 31 may instruct the CP module 24 to first generate a message and then propagate the generated message to the HLR 22, an off-board SCP or other specialized database capable of either (1) providing a particular calling feature or advanced subscriber service to the operator of the mobile terminal 12 via the MSC 16; or (2) transferring information to the MSC 16 which allows the MSC 16 to provide the caller feature or advanced subscriber service to the operator of the mobile terminal 12 which had been requested by the generation of a trigger criteria by the mobile terminal 12 and transmission of the trigger criteria to the MSC 16. If, however, the script file 23-1 through 23-N does not include the programming script 31 and the criteria statement 29 points to a location within the CP module 24 (or elsewhere within the MSC 16, for example, within the memory subsystem), the program script execution module 26 will instruct the CP module 24 to execute a set of at least one instruction contained at the specified location. By executing the specified instructions, the CP module 24 will provide the calling feature or other advanced subscriber service to the operator of the mobile terminal 12. Having executed the programming script 31 or instruction set contained within the CP module 24 (or elsewhere within the MSC 16), the method concludes at step 50.

Figure 2:
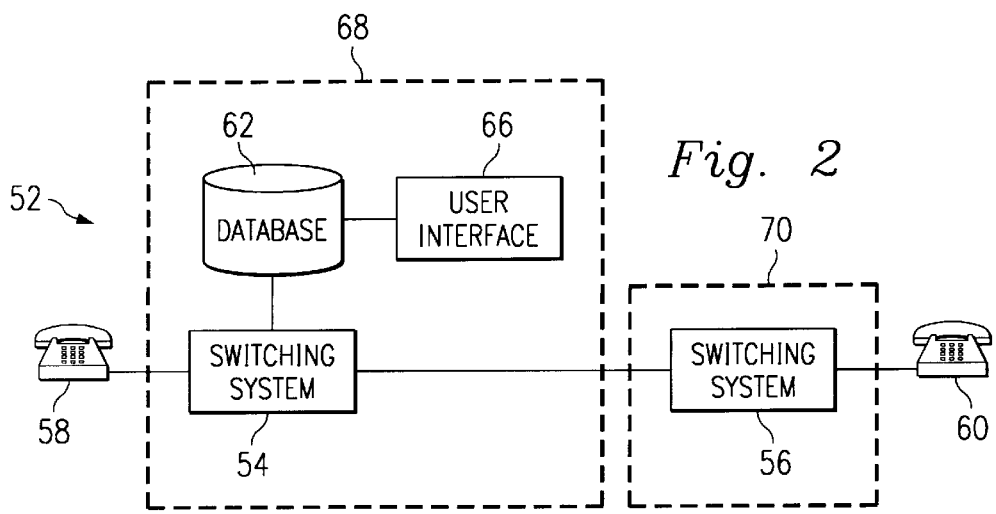
FIG. 2 is a block diagram of an intelligent wireline telecommunications network which includes a switch constructed in accordance with the teachings of the present invention.

Referring next to FIG. 2, an intelligent wireline network 52, for example, the PSTN, constructed in accordance with the teachings of the present invention shall now be described in greater detail. The intelligent wireline telecommunications network 52 include plural switching devices, two of which are illustrated in FIG. 2 as switching devices 54 and 56, respectively. Each switching device 54, 56 which, for example, may be a DMS-250 switch manufactured by Northern Telecom of Montreal, Canada, is configured to establish a connection between terminals, for example, a telephone 58 coupled to the switching system 54 and a telephone 60 coupled to the switching system 56. The switching system 54 is located within a central office 68 which handles call processing requests for the terminal 58 while the switching system 56 is located within a central office 70 which handles call processing request for the terminal 60. For purposes of the invention disclosed herein, it should be understood that the switching system 54 operates in a fashion similar to the MSC 16. Thus, the switching system 54 includes a processor subsystem where a CP module and a program script execution module reside and a memory subsystem for holding script files downloaded thereto.

Also residing within the central office 68 and coupled to the switching system 54 is a database 62. Alternately, the database 62 may be a separate memory device coupled to the switching system 54 or may be a memory subsystem incorporated within the switching system 54. The database maintains script files used to trigger advanced subscriber services. A user interface 66, which, like the user interface 25, may be a conventional computer system user interface such as a keyboard and monitor, resides within the central office 68 and is coupled to the database 62. By operating the user interface 66, a system administrator for the central office 68 may add new script files, modify existing script files or delete existing script files. Of course, if the database 62 is incorporated into the switching system 54, the user interface 66 would be directly coupled to the switching system 54. As each individual script file triggers a respective advanced subscriber service, by modifying the collection of script files maintained in the database 62, the advanced subscriber services available to the terminal 58 may be dynamically modified.

The sole remaining distinction between the wireline and wireless embodiments of the invention relates to the manner by which the script files are transferred to the memory subsystem of the switching system 54. As mobile terminals must periodically register with a MSC, the present invention was able to take advantage of the registration process in that the script files were transferred to the MSC during registration. Thus, in the event that the script files were modified, all such modifications would be transferred to the MSC the next time that the mobile terminal registers therewith. This enabled dynamic modification of the subscriber services available to the mobile terminal. In the wireline embodiment of the invention, there is no counterpart to the registration process. Accordingly, to ensure that the script files maintained by the switching system 54 are dynamically modifiable, it is contemplated that the script files should be periodically downloaded from the database 62 to the switching system 54 where the most recent version of the script files would overwrite the prior version thereof. By doing so, modifications of the script files made at the database 62 would be quickly reflected in the script files held in the memory subsystem of the switching system 54.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. An intelligent telecommunications network, comprising:

a database, said database holding a set of at least one script file, each of said at least one script file comprised of a criteria statement and programming script, said criteria statement of each one of said at least one script file having a first portion which describes a type of information which may contain a trigger and a second portion which contains a trigger criteria;

a user interface, coupled to said database, for modifying said set of at least one script file held in said database;

a switching system, said switching system connected to receive information from terminals and script files from said database, said switching system including a memory subsystem having at least one script file stored therein;

each of said at least one script file stored in said memory subsystem having been downloaded from said database to said switching system;

said programming script of a first one of said at least one script file stored in said memory subsystem of said switching system being executable, by said switching system, in response to said switching system detecting a trigger which matches said trigger criteria contained in said second portion of said criteria statement for said first script file, said switching system determining if information received from a terminal includes said trigger criteria contained in said second portion of said first script file if said received information includes said type of information described in said first portion of said first script file.

2. The apparatus of claim 1 wherein said switching system further comprises:

a processor subsystem, coupled to said memory subsystem, for receiving said information from said terminal, comparing said received information to said criteria statement of each of said at least one script file held in said memory subsystem and executing said programming script of each of said at least one script file for which said criteria statement matches said received information.

3. The apparatus of claim 1 wherein said database is a home location register.

4. The apparatus of claim 3 wherein said switching system is a mobile switching center.

5. The apparatus of claim 4 wherein said memory subsystem is a visitor location register.

6. The apparatus of claim 2 wherein said database and said switching system are both located at a central office of a wireline telecommunications system.

7. The apparatus of claim 6 wherein said database resides within said switching system.

8. The apparatus of claim 2 wherein said processor subsystem further comprises:

a call processing module for receiving said information from said terminal, receiving said at least one script file downloaded from said database and storing said at least one script file downloaded from said database in said memory subsystem; and a program script execution module for comparing said received information to said criteria statement of each of said at least one script file held in said memory subsystem and for executing said programming script of each of said at least one script file for which said criteria statement matches said received information.

9. An intelligent telecommunications network, comprising:

a database, said database holding a set of at least one script file, each of said at least one script file comprised of a criteria statement having a first portion which describes a type of information which may contain a trigger and a second portion which contains a trigger criteria;

a user interface, coupled to said database, for modifying said set of at least one script file held in said database;

a switching system, said switching system connected to receive information from terminals and script files from said database, said switching system including a memory subsystem having at least one script file stored therein;

each of said at least one script file stored in said memory subsystem having been downloaded from said database to said switching system;

for each one of said at least one script file stored in said memory subsystem, said switching system having a set of at least one instruction executable, by said switching system, in response to said switching system detecting a trigger which matches said trigger criteria of said second portion of said criteria statement for a first one of said at least one script file stored in said memory subsystem, said switching system determining if information received from a terminal contains said trigger criteria contained in said second portion of said first script file if said received information includes said type of information described in said first portion of said first script file.

10. The apparatus of claim 9 wherein said switching system further comprises:

a processor subsystem, coupled to said memory subsystem, for receiving said information from said terminal, comparing said received information to said criteria statement of each of said at least one script file held in said memory subsystem and executing said at least one instruction corresponding to said criteria statement which matches said received information.

11. The apparatus of claim 10 wherein said database is a home location register, said switching system is a mobile switching center and said memory subsystem is a visitor location register.

12. The apparatus of claim 10 wherein said database and said switching system are both located at a central office of a wireline telecommunications system.

13. The apparatus of claim 12 wherein said database resides within said switching system.

14. The apparatus of claim 10 wherein said processor subsystem further comprises:

a call processing module for receiving said information from said terminal, receiving said at least one script file downloaded from said database and storing said at least one script file downloaded from said database in said memory subsystem; and a program script execution module for comparing said received information to said criteria statement of each of said at least one script file held in said memory subsystem and for instructing said call processing module to execute said at least one instruction corresponding to said script file for which said criteria statement matches said received information.

15. For an intelligent telecommunications network having a database and a switch coupled to said database, a method of invoking an action, by said switch, in response to receiving information from a terminal coupled to said switch, said method comprising the steps of:

storing a set of at least one script file in a database, each of said at least one script file comprised of a criteria statement having a first portion which describes a type of information which may contain a trigger and a second portion which contains a trigger criteria;

downloading, from said database, at least one script file of said set of at least one script file to a switch coupled to said database;

storing said at least one downloaded script file at said switch;

upon receiving information from a terminal coupled to said switch, said switch determining if said received information is of said type of information described in one of said at least one downloaded script file;

if said received information is of said type of information described in one of said at least one downloaded script files, determining if said received information contains a trigger which matches said trigger criteria contained in said second part of said criteria statement of said one of said at least one downloaded script file which describes said type of said received information;

executing a set of at least one instruction, maintained by said switch and corresponding to said trigger criteria for said one of said at least one script file downloaded from said database for which said trigger criteria matched said trigger contained in said received information.

16. The method of claim 15 wherein the step of executing said set of instructions corresponding to each of said at least one script file for which said criteria statement matches said received received further comprises the steps of:

generating a message; and propagating said message to a device coupled to said switch.

17. The method of claim 15 and further comprising the step of periodically updating said at least one script file downloaded from said database to said switch.

18. The method of claim 17 and further comprising the step of:

modifying, at said database, said at least one script file downloaded from said database to said switch; and periodically downloading said at least one modified script file to said switching system.

19. The method of claim 18 wherein said terminal is a mobile terminal, said database is a home location register for said mobile terminal and said switching system is a mobile switching center being visited by said mobile terminal.

20. The method of claim 19 wherein the step of periodically downloading said at least one modified script file to said switching system further comprises the step of:

downloading said at least one modified script file to said mobile switching center each time said mobile terminal visits said mobile switching center.

21. The method of claim 20 wherein a visitor location register is coupled to said mobile switching center and wherein said at least one modified script file is stored in said visitor location register.

22. The method of claim 18 wherein said database and said switching system are located at a central office.

23. The method of claim 15 wherein the step of executing said programming script of each of said at least one script file downloaded from said database to said switch for which said criteria statement matches said received string of digits further comprises the steps of:

generating a message; and propagating said message to a device coupled to said switch.

24. The method of claim 15 and further comprising the step of periodically updating said at least one script file downloaded from said database to said switch.

25. The method of claim 24 and further comprising the step of:

modifying, at said database, said at least one script file downloaded from said database to said switch; and periodically downloading said at least one modified script file to said switching system.

26. The method of claim 25 wherein said terminal is a mobile terminal, said database is a home location register for said mobile terminal and said switching system is a mobile switching center being visited by said mobile terminal.

27. The method of claim 21 wherein the step of periodically downloading said at least one modified script file to said switching system further comprises the step of:

downloading said at least one modified script file to said mobile switching center each time said mobile terminal visits said mobile switching center.

28. The method of claim 27 wherein a visitor location register is coupled to said mobile switching center and wherein said at least one modified script file is stored in said visitor location register.

29. The method of claim 25 wherein said database and said switching system are located at a central office.

30. An intelligent telecommunications network, comprising:

a database, said database holding a set of at least one script file, each of said at least one script file comprised of a criteria statement and programming script, said criteria statement for each one of said at least one script file having a first portion which describes a type of information which may contain a trigger and a second portion which contains a trigger criteria;

a user interface, coupled to said database, for modifying said set of at least one script file held in said database;

a switching system connected to receive information from terminals and script files from said database, said switching system comprising:

a memory subsystem;

a call processing module terminals for receiving said information from said terminals and script files from said database;

a program script execution module coupled to said call processing module;

said database downloading at least one of said script files held in said database;

upon receiving said at least one of said set of script files from said database, said call processing module storing said received script files in said memory subsystem; and upon receiving information from a first one of said terminals, said call processing module transferring said received information and a first downloaded script file stored in said memory subsystem to said programming script execution module;

said program script execution module determining if said received information from said terminal contains a trigger criteria which matches said criteria statement for each of said at least one script file transferred to said program script execution module upon determining if said received information includes said type of information described in a first portion of one of said at least one script file;

said program script execution module issuing at least one instruction which corresponds to said matching criteria statement to said call processing module.

31. An intelligent telecommunications network, comprising:

a database, said database holding a set of at least one script file, each of said at least one script file comprised of a criteria statement and programming script;

said criteria statement having a first portion which describes a type of trigger and a second portion which contains a trigger criteria;

a user interface, coupled to said database, for modifying said set of at least one script file held in said database;

a switching system, said switching system connected to receive information from terminals and script files from said database;

at least one of said set of script files being downloaded to said switching system;

said switching system determining if information received from one of said terminals during a call set-up contains information of a type identified in a first portion of a criteria statement of a first one of said at least one script file downloaded to said switching system;

said programming script of said first one of said at least one script file downloaded to said switching system being executed, by said switching system, in response to said switching system detecting, in said information received from one of said terminals, a trigger which matches a trigger criteria identified in a second portion of said first one of said at least one script file downloaded to said switching system, said switching system examining said information received from one of said terminals to detect said trigger upon determining that said information contains said type of information identified in said first portion of said criteria statement of said first one of said at one script file downloaded to said switching system.

32. The apparatus of claim 31 wherein said switching system further comprises:

a processor subsystem, coupled to said memory subsystem, for receiving said information from said terminal, determining if said received information includes said type of information identified in said first portion of said criteria statement of said first one of said script files downloaded to said switching system, comparing said received information to said trigger criteria identified in said second portion of said first one of said at least one script file downloaded to said switching system and executing said programming script of said first one of said at least one script file downloaded to said switching system if said trigger criteria matches said received information.

33. The apparatus of claim 32 wherein said processor subsystem further comprises:

a call processing module for receiving said information from said terminal and receiving said at least one script file downloaded from said database; and a program script execution module for determining if said received information includes information of said type identified in said first portion of said criteria statement of each of said at least one script file downloaded to said switching system and for executing said programming script of said first one of said at least one script file downloaded to said switching system for which said trigger criteria identified in said second portion of said criteria statement matches said trigger in said received information.

34. A switch for an intelligent telecommunications network, said switch comprising:

a processor subsystem; and a memory subsystem;

said memory subsystem maintaining at least one script file comprised of a criteria statement and programming script;

said criteria statement having a first portion which describes a type of trigger and a second portion which contains a trigger criteria; from terminals and script files from said database;

said processor subsystem determining if information received from a terminal during a call set-up contains information of a type identified in a first portion of a criteria statement of one of said at least one script file maintained in said memory subsystem;

said programming script of said one of said at least one script file maintained in said memory subsystem being executed, by said switching system, in response to said processor subsystem detecting, in said information received from said terminal, a trigger which matches a trigger criteria identified in a second portion of said one of said at least one script file maintained in said memory subsystem, said processor subsystem examining said information received from one of said terminals for said trigger upon determining that said received information contains said type of information identified in said first portion of said criteria statement of said first one of said at one script file maintained in said memory subsystem.

* * * * *